(12) United States Patent
Walker et al.

(10) Patent No.: US 11,442,858 B1
(45) Date of Patent: Sep. 13, 2022

(54) BIAS CONTROL FOR A MEMORY DEVICE

(71) Applicant: Micron Technology, Inc., Boise, ID (US)

(72) Inventors: Dean Walker, Allen, TX (US); Bryan D. Hornung, Plano, TX (US); Tony M. Brewer, Plano, TX (US); David M. Patrick, McKinney, TX (US); Christopher A. Baronne, Allen, TX (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/198,084

(22) Filed: Mar. 10, 2021

(51) Int. Cl.
*G06F 12/08* (2016.01)
*G06F 12/0815* (2016.01)
*G06F 12/0868* (2016.01)

(52) U.S. Cl.
CPC ...... *G06F 12/0815* (2013.01); *G06F 12/0868* (2013.01); *G06F 2212/1041* (2013.01)

(58) Field of Classification Search
None
See application file for complete search history.

(56) References Cited

U.S. PATENT DOCUMENTS

| | | |
|---|---|---|
| 2018/0293690 A1 | 10/2018 | Ray et al. |
| 2019/0018806 A1 | 1/2019 | Koufaty et al. |
| 2019/0102311 A1* | 4/2019 | Gupta ............... G06F 12/0884 |
| 2020/0012604 A1* | 1/2020 | Agarwal ............ G06F 12/0815 |
| 2020/0201765 A1 | 6/2020 | Williams et al. |
| 2021/0200545 A1* | 7/2021 | Marolia ............. G06F 9/30145 |
| 2021/0311878 A1* | 10/2021 | Duan ............... G06F 12/0877 |
| 2021/0373951 A1* | 12/2021 | Malladi ............ G06F 12/0284 |

OTHER PUBLICATIONS

"International Search Report and Written Opinion of the International Searching Authority," issued in connection with Int'l Appl. No. PCT/US21/73118, dated May 30, 2022, 8 pages.
Marandola et al., "Pattern Based Cache Coherency Architecture for Embedded Manycores", Procedia Computer Science, vol. 80, Jun. 1, 2016, pp. 1542-1553.

* cited by examiner

*Primary Examiner* — Kaushikkumar M Patel

(74) *Attorney, Agent, or Firm* — Holland & Hart LLP

(57) ABSTRACT

Methods, systems, and devices for bias control for a memory device are described. A memory system may store indication of whether data is coherent. In some examples, the indication may be stored as metadata, where a first value indicates that the data is not coherent and a second value or a third value indicate that the data is coherent. When a processing unit or other component of the memory system processes a command to access data, the memory system may operate according to a device bias mode when the indication is the first value, and according to a host bias mode when the indication is the second value or the third value.

33 Claims, 8 Drawing Sheets

BIAS CONTROL FOR A MEMORY DEVICE

STATEMENT REGARDING GOVERNMENT SUPPORT

This invention was made with Government support under Contract No. 2168213 awarded by U.S. Department of Energy. The Government has certain rights in the invention.

FIELD OF TECHNOLOGY

The following relates generally to one or more systems for memory and more specifically to bias control for a memory device.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
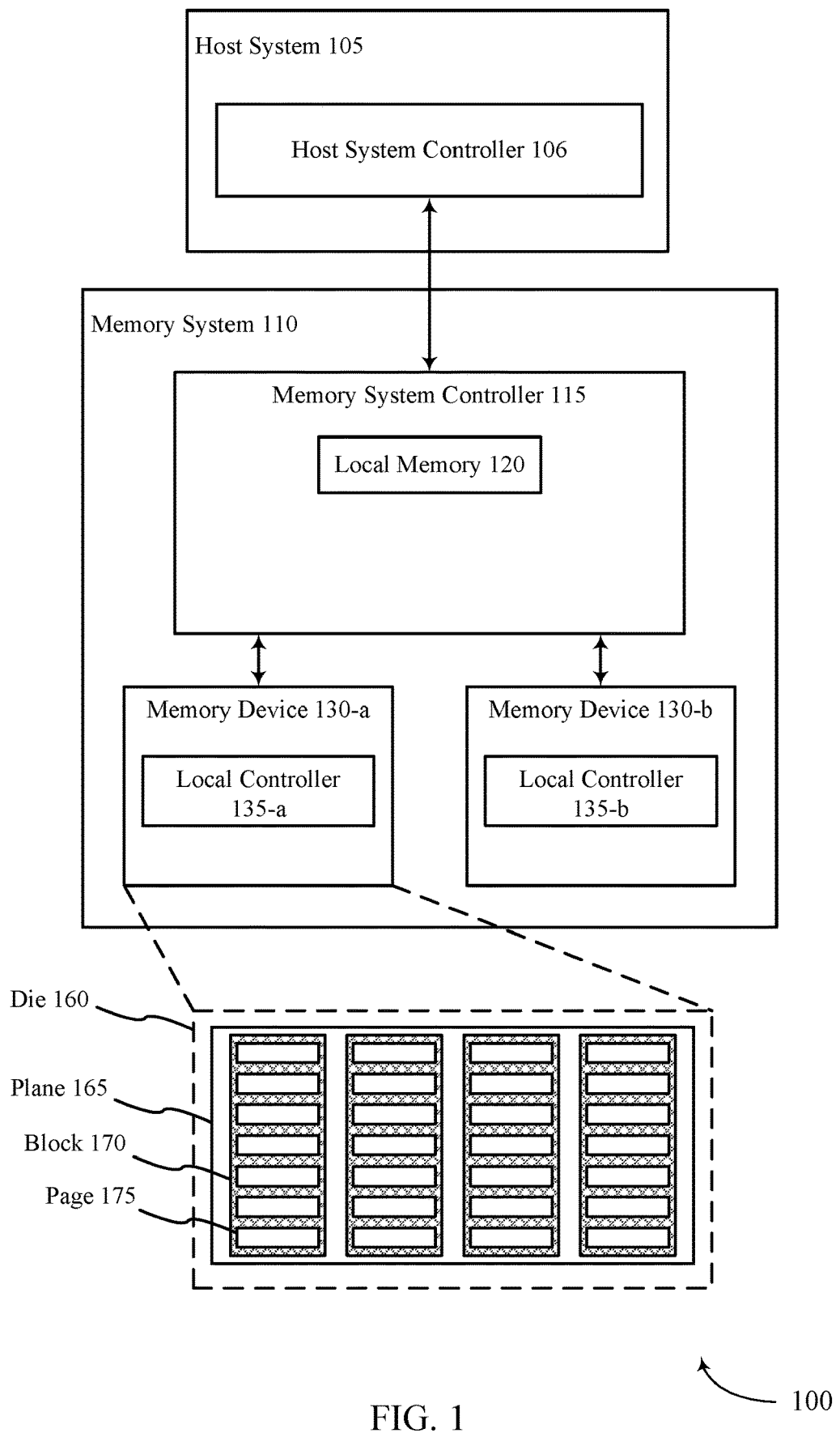
FIG. 1 illustrates an example of a system that supports bias control for a memory device in accordance with examples as disclosed herein.

Some interfaces (e.g., the Compute Express Link (CXL) interface) may provide a mechanism for a bias-based coherency model. Specifically, the CXL specification defines that a device-attached memory can track the bias state to determine if the device needs to send a request to the host device to resolve coherency when the device (e.g., a processing unit of the device) accesses the memory. The two bias states are host bias, where the device needs to send a request to the host device to resolve coherency, and device bias, where the memory device may access the memory independent of the host device.

The CXL specification indicates that the device will maintain a bias table for blocks (e.g., pages) of memory and a transition agent for managing bias transitions. Bias transitions are generally managed by software through the use of commands between the memory device and host device, and are managed on a per-block basis. However, managing bias transitions on a per-block basis may result in inefficiencies when portions of a block may have different coherency states.

Methods and systems for managing bias translations at a relatively finer granularity are described herein. The CXL specification describes metadata that can be maintained with each line of data. One of the described metadata fields is the Meta0-state, which can hold one of three values, Invalid, Any, or Shared. The invalid state indicates that the host does not have a cacheable copy of the line, the any state indicates the host may have a shared, exclusive, or modified copy of the line, and the shared state indicates that the host may have at most a shared copy of the line. The CXL specification thus indicates that bias states, which are used to synchronize control over coherency, are maintained separate from the Meta0-states, which indicate the caching or coherency state. The Meta0-states may be stored for each line, and may be stored with the line data.

As described herein, the Meta0-state field may be used to track the current bias state. In particular, according to various aspects a Meta0-state of Invalid may be equated to device bias and both Any and Shared may be equated to host bias. Tracking device attached media bias at a granularity that corresponds to a cache line size of the host device may allow the device to transition the media's bias on any component that has access to that media. This allows complete hardware control of bias and eliminates the need for software to undertake the complex task of transitioning the device attached media bias for optimal device performance. In some examples, the Meta0-state may be stored with the line of data in the memory media, or may be stored only in a device cache (e.g., maintained only for lines in the cache). If it is stored only in the cache, the device would assume a state of Any on a cache miss. In either instance, utilizing the Meta0-state of the CXL specification to track the bias state on a per-cache-line basis may improve the overall performance of the memory device while maintaining a relatively simplistic programming model.

Features of the disclosure are initially described in the context of systems as described with reference to FIGS. 1 through 3. Features of the disclosure are described in the context of process flow diagrams as described with reference to FIGS. 4 and 5. These and other features of the disclosure are further illustrated by and described with reference to an apparatus diagram and flowcharts that relate to bias control for a memory device as described with reference to FIGS. 6-8.

FIG. 1 illustrates an example of a system 100 that supports bias control for a memory device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA)controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), a Low Power Double Data Rate (LPDDR) interface, and a CXL interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device, though other types of managed memory devices are supported. For example, a managed memory device may include any type or quantity of volatile or non-volatile memory devices.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support bias control for a memory device. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the host system 105 may include a cache that includes one or more pages (e.g., one or more pages for storing data). Each page may include one or more lines that are each associated with a quantity of data. As described herein, the memory system controller 115 may be configured to track the coherency of data shared between the host system 105 and the memory system 110. For example, the memory system controller 115 may track coherency of data shared between the memory device 130-a or the memory device 130-b and the host system 105. The coherency of the data may pertain to one of three states that indicate whether no coherent copies of the data exist at the host system 105 and the memory system 110, or whether a shared, exclusive or modified copy of the data exists.

The memory system 110 may be am example of a CXL device, and the memory system controller 115 may be an example of a processing unit that is configured to access the memory device 130-a and the memory device 130-b. For example, the memory system controller 115 may be configured to access the memory device 130-a and the memory device 130-b according to a host bias mode or a device bias mode. When operating according to a device bias mode, the memory system controller 115 may access the memory device 130-a or the memory device 130-b (e.g., upon receiving an access request or access command) independent of the host system 105. Conversely, when operating according to a host bias mode, the memory system controller 115 may access the memory device 130-a or the memory device 130-b via the host system 105. In addition, when one or more pages are associated with host bias mode, the host may modify the version of the one or more pages maintained by the host without notifying the memory system controller 115.

In some examples, each line of data stored to the memory device 130-a or the memory device 130-b may be associated with an optional 2-bit Meta® field. As described herein, the 2-bit Meta® field may be used to indicate a bias state of associated data based on the three coherency states. For example, when data is associated with a first coherency state (e.g., an "invalid" state; when no coherent copy of the data exists), the Meta® field may indicate to operate according to a device bias mode. Additionally or alternatively, when data is associated with a second coherency state (e.g., an "any" state; when a coherent copy of the data exists) or a third coherency state (e.g., a "shared" state; when a coherent copy of the data exists), the Meta® field may indicate to operate according to a host bias mode. Thus, utilizing the Meta0-state to track device bias may allow for bias states to be tracked in a more granular manner.

Figure 2:
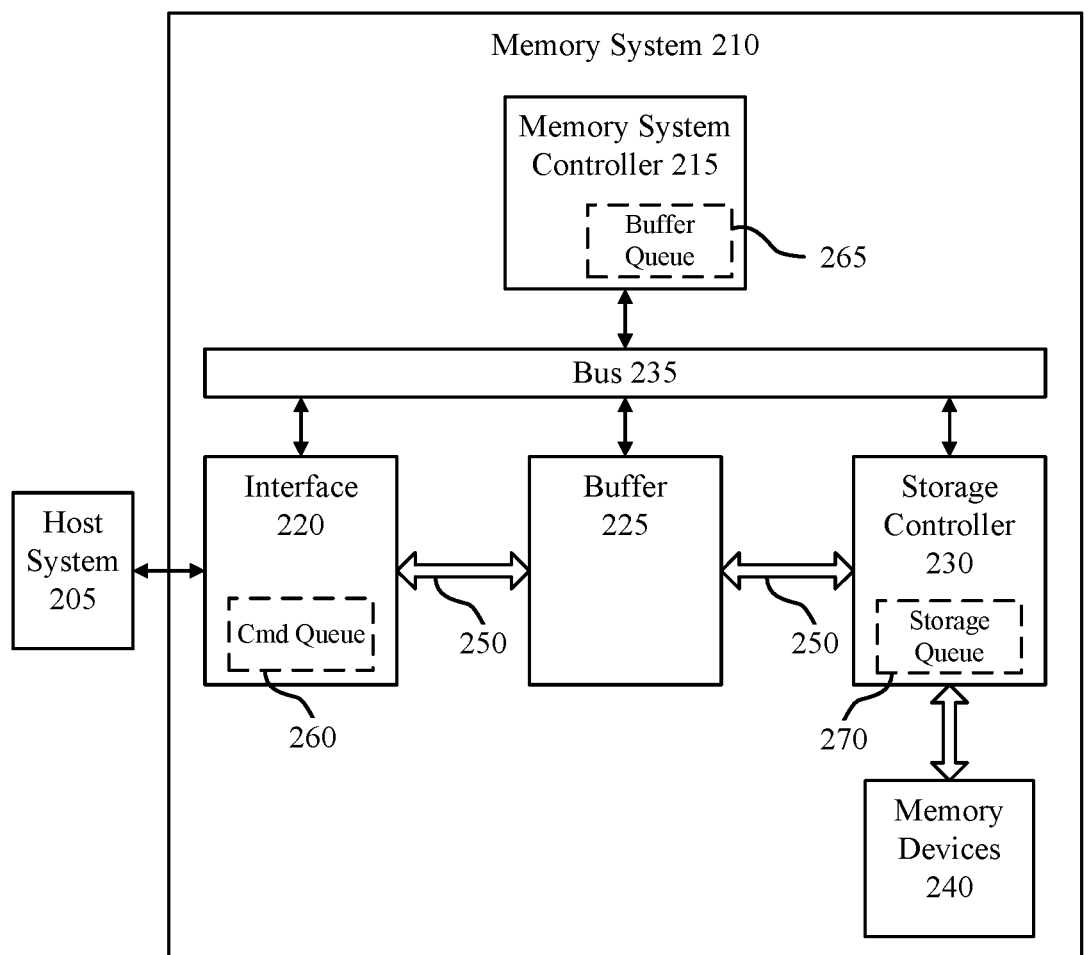
FIG. 2 illustrates an example of a system that supports bias control for a memory device in accordance with examples as disclosed herein.

FIG. 2 illustrates an example of a system 200 that supports bias control for a memory device in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol, an eMMC protocol, a CXL protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol, an eMMC protocol, a CXL protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the host system 205 may include a cache that includes one or more pages (e.g., one or more pages for storing data). Each page may include one or more lines that are each associated with a quantity of data. As described herein, the memory system controller 215 may be configured to track the coherency of data shared between the host system 205 and the memory system 210. For example, the memory system controller 215 may track coherency of data shared between device memory (not shown) and the host system 205 (not shown). For example, one or more of the memory devices 240 may be a CXL device that is configured to access data stored to memory (e.g., device memory) that is accessible to various devices. The memory system controller 215 may track the coherency of the data, which may pertain to one of three states that indicate whether no coherent copies of the data exist at the host system 205 and the memory system 210, or whether a shared, exclusive or modified copy of the data exists.

The memory system 210 may be an example of a CXL device that may be configured to access the device memory (memory devices 240). For example, a CXL device may include a processing device (not shown) configured to access the device memory according to a host bias mode or a device bias mode. When operating according to a device bias mode, the memory system controller 215 may access the device memory (e.g., upon receiving an access request or access command) independent of the host system 205. Conversely, when operating according to a host bias mode, the memory system controller 215 may access the device memory via the host system 205. Thus, when operating according to a host bias mode, the host system 205 may be configured to access the device memory for the respective CXL device.

In some examples, each line of data stored to the device memory may be associated with an optional 2-bit Meta® field. As described herein, the 2-bit Meta® field may be used to indicate a bias state of associated data based on the three coherency states. For example, when data is associated with a first coherency state (e.g., an "invalid" state; when no coherent copy of the data exists), the Meta® field may indicate to operate according to a device bias mode. Additionally or alternatively, when data is associated with a second coherency state (e.g., an "any" state; when a coherent copy of the data exists) or a third coherency state (e.g., a "shared" state; when a coherent copy of the data exists), the Meta® field may indicate to operate according to a host bias mode. Thus, utilizing the Meta0-state to track device bias may allow for bias states to be tracked in a more granular manner.

Figure 3:
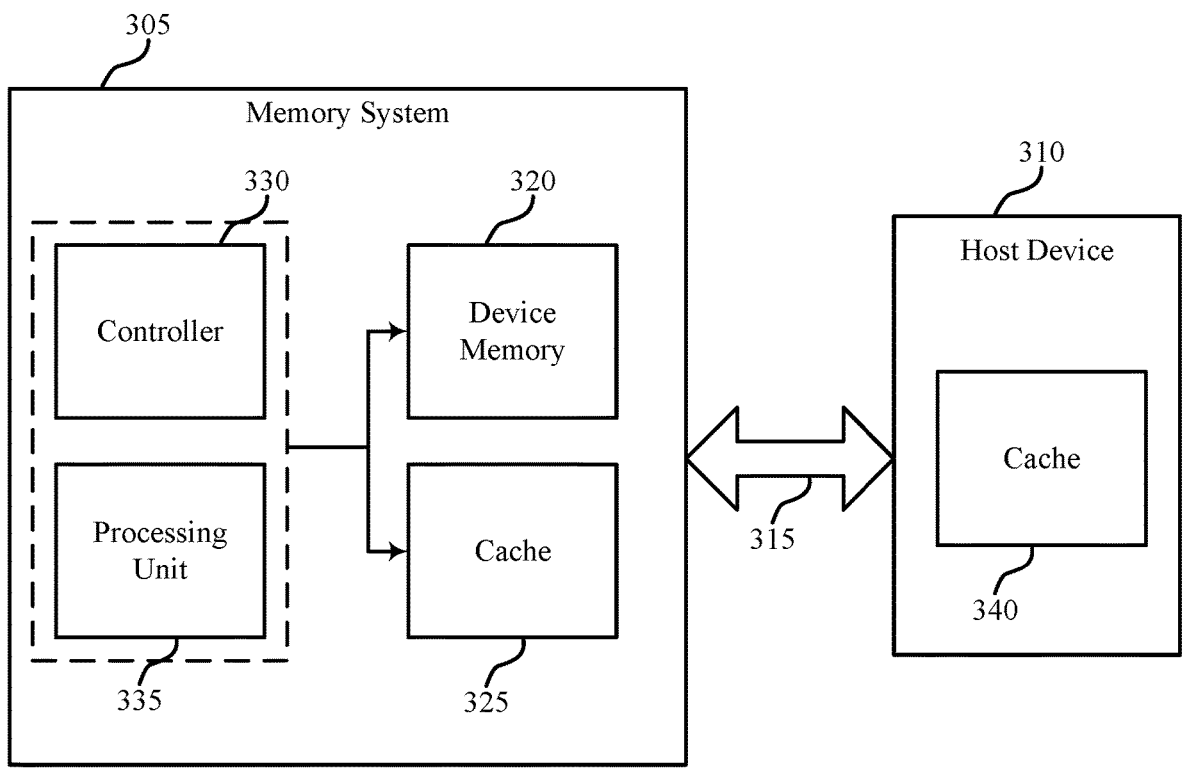
FIG. 3 illustrates an example of a system that supports bias control for a memory device in accordance with examples as disclosed herein.

FIG. 3 illustrates an example of a system 300 that supports bias control for a memory device in accordance with examples as disclosed herein. The system 300 may include a memory system 305 and a host device 310. The memory system 305 may be coupled with the host device 310 via an interface 315, which may be a CXL interface. The memory system 305 may include device memory 320, a cache 325, a controller 330, and a processing unit 335, and the host device 310 may include a cache 340. In some examples, the system 300 may be configured to use one or more metadata fields, such as the Meta0-state, to track coherency states of data. In addition, utilizing the Meta0-state to track the bias state on a per-cache-line basis may improve the overall performance of the memory system 305 while maintaining a relatively simplistic programming model.

The memory system 305 may be a CXL device. The device memory 320 may be accessible by one or more accelerators that include or may be associated with a processing unit 335. The processing unit 335 and controller 330 shown in FIG. 3 may be a single logic component formed on a same field programmable gate array (FPGA) or application-specific integrated circuit (ASIC). However, in some examples, the controller 330 and processing unit 335 may be individual components. For example, the processing unit 335 may be associated with a graphics processing unit (GPU) or general-purpose graphics processing unit (GPGPU) of the memory system 305. The processing unit 335 may be configured to transmit signaling and/or commands to the controller 330 for accessing the device memory 320. As described herein, the controller 330 may access the device memory 320 independent of the host device 310 in a device bias state, whereas the controller 330 may access the device memory 320 via the host device 310 in a host bias state.

In some examples, the host device 310 may include a cache 340. The cache 340 may include a set of pages, which may each include 4 kB of data. Moreover, each page may include one or more blocks, which may be referred to as cache lines, and each cache line may include 64B of data. Although the size of each page and cache line is meant for exemplary purposes only, and each page and cache line may be configured to store a different quantity of data, the memory system 305 may be configured to track bias states on a per-cache-line basis using the Meta0-states instead of a bias table that is maintained on a page basis. That is, utilizing the Meta0-state to track device bias may allow for bias states to be tracked in a more granular manner.

The device memory 320 may be configured to store data that is accessible by the processing unit 335 (e.g., via the controller 330) and the host device 310. Because the data is accessible by both the processing unit 335 and the host device 310 (e.g., the data is shared), it is desirable for coherency of the data to be tracked. That is, it is desirable for both the processing unit 335 and the host device 310 to know whether data in the cache 340 is coherent with corresponding data (for the same address) in the device memory 320. To track cache coherency, three states of cache coherency may be maintained and tracked using metadata. For example, a first state may be associated with an "invalid" state—e.g., the cache 340 of the host device 310 does not have a cacheable copy of the data. The second state may be associated with an "any" state—e.g., the cache 340 of the host device 310 may have a shared, exclusive or modified copy of the data. The third state may be associated with a "shared" state—e.g., the cache 340 of the host device 310 may have, at most, a shared copy of the data. As the coherency states of the data change, updated metadata associated with the coherency state may be stored to the device memory 320.

In some examples, data stored to the device memory 320 may be accessed according to a device bias mode or a host bias mode. Host bias mode may prioritize coherent access from the host device 310 to the device memory 320. Host bias mode may be used during work submission, when data is being written from the host device 310 to the device memory 320, and during work completion when data is being read by the host device 310 from the device memory 320. In host bias mode, the device memory 320 may appear, to the memory system (or to the processing unit 335) just like memory attached to the host device 310. If the processing unit 335 requires access to the device memory 320 when operating in host bias mode, the access operation is handled by the controller 330 first transmitting a request (e.g., a command; signaling) to the host device 310.

Conversely, in device bias mode the processing unit 335 may access the device memory 320 directly. That is, the processing unit 335 may access the device memory 320 without any interaction by the host device 310. Thus, if the processing unit 335 requires access to the device memory 320 when operating in device bias mode, the access operation may be handled by the controller 330 accessing the device memory 320 directly.

The CXL specification provides for an optional 2-bit Meta® field that can be associated with device attached media. According to various aspects described herein, the 2-bit Meta® field may be used to convey a coherency state of data (e.g., of data associated with a size of a cache line of the cache 340), and the coherency state may be used for determining a bias state of the associated data. In some examples, the Meta® field may be configured to store a first value (e.g., a first bit value) that is associated with the "invalid" coherency state. When the Meta® field includes the first value, data associated with the Meta® field may be accessed according to a device bias mode. Additionally or alternatively, the Meta® field may be configured to store a second value (e.g., a second bit value) and a third value (e.g., a third bit value) that are associated with the "shared" and "any" states. When the Meta® field includes either the second value or the third value, data associated with the Meta® field may be accessed according to a host bias mode.

In some examples, a respective Meta® field may be associated with each line of data stored to the device memory 320, and thus may be determined when the processing unit 335 requires access to the device memory 320. For example, the processing unit 335 may communicate an access request (e.g., a command; signaling) to the controller 330, and the controller may determine the Meta® value of the associated data. Depending on the Meta® value (e.g., the coherency state), the controller 330 may have direct access to the line of data (e.g., according to a device bias mode) or may communicate a request (e.g., a command; signaling) to the host device 310 for resolving coherency associated with the data (e.g., according to a host bias mode).

The host device 310 may periodically update either the coherency state of the data and/or the Meta® field associated with data. For example, if the host device 310 performs any operations that affect the coherency of data, the host device 310 may communicate the change to the memory system 305. In some examples, the host device 310 may communicate the updated coherency state to the memory system 305 (e.g., explicitly or implicitly from access commands), and the controller 330 may use the updated coherency state to update the Meta® field of the associated data that is stored to the device memory 320 or the cache 325. In other examples, the host device 310 may communicate the updated Meta® field to the memory system 305, and the controller 330 may update the Meta® field of the associated data that is stored to the device memory 320 or the cache 325.

Additionally or alternatively, the cache 325 may be used to determine whether to access data according to a device bias state or a host bias state. For example, data and an associated Meta® field may be stored to the cache 325. That is, in some examples, the Meta® fields may be stored only with cached data and not data stored to the device memory 320. When the processing unit 335 requires access to the data (e.g., when the processing unit 335 communicates a command for the data to the controller 330), the controller 330 may determine whether the data is stored to the cache 325. If the data is stored to the cache (e.g., when there is a cache "hit"), the data may be accessed according to the coherency state indicated by the Meta® field (e.g., by associating coherency states to bias states). In other examples, if the data is not stored to the cache (e.g., when there is a cache "miss"), the controller 330 may assume that the data is associated with a host bias state. Accordingly, when there is a cache "miss", the processing unit 335 may access the device memory 320 via the host device 310. Whether the Meta® field is stored to the device memory 320 or to the cache 325, utilizing the Meta0-state to track the bias state on a per-cache-line basis may improve the overall performance of the memory system 305 while maintaining a relatively simplistic programming model.

Figure 4:
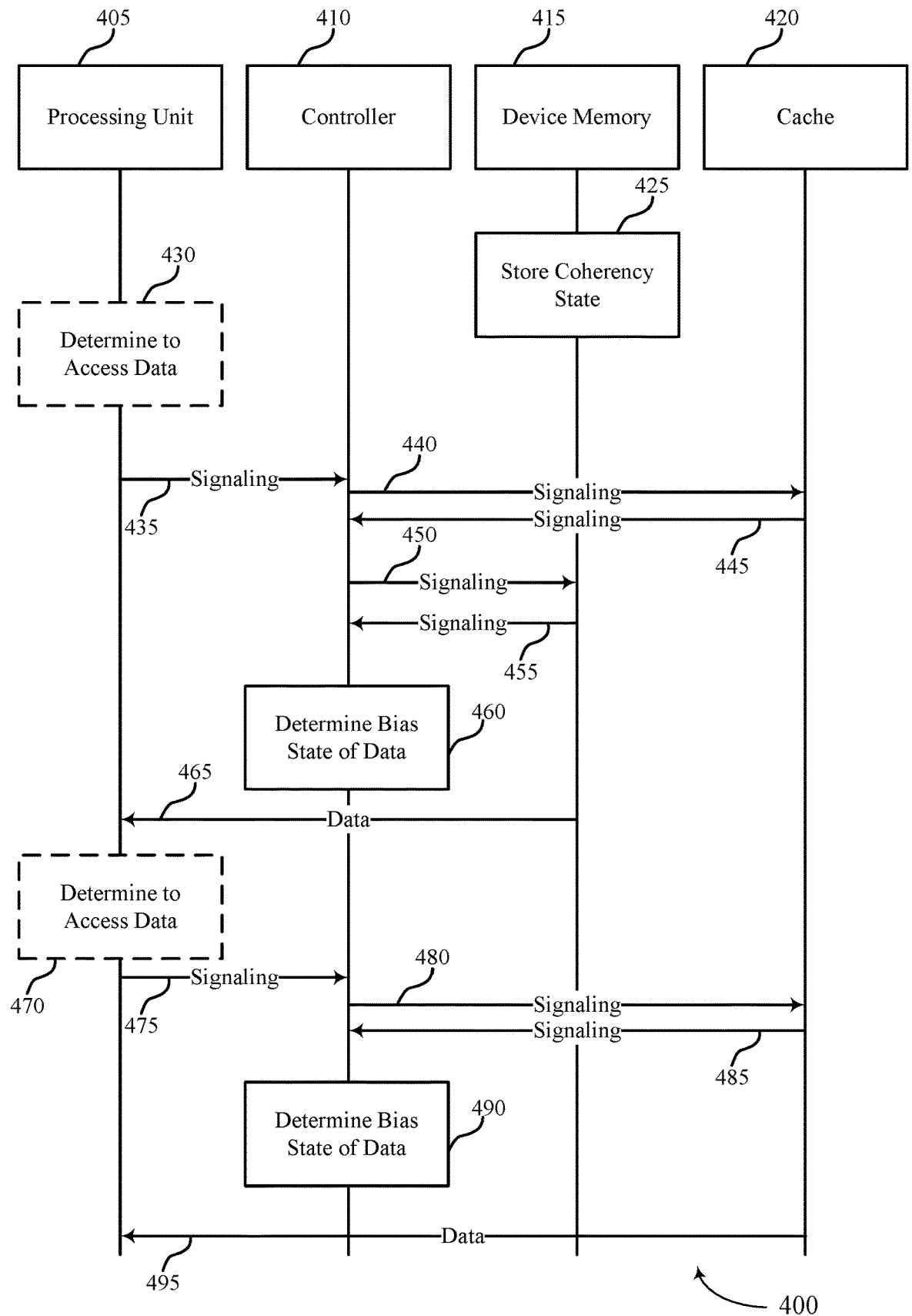
FIG. 4 illustrates an example of a process flow diagram that supports bias control for a memory device in accordance with examples as disclosed herein.

FIG. 4 illustrates an example of a process flow diagram 400 that supports bias control for a memory device in accordance with examples as disclosed herein. The process flow diagram 400 may illustrate the operations of a processing unit 405, a controller 410, a device memory 415, and a cache 420. In some examples, the processing unit 405, controller 410, device memory 415, and cache 420 may be examples of a processing unit 335, a controller 330, a device memory 320, and a cache 325, respectively, of a memory system 305 as described with FIG. 3. The process flow diagram 400 may illustrate utilizing a Meta0-state to track a bias state on a per-cache-line basis, which may improve the overall performance of the memory system 305 while maintaining a relatively simplistic programming model.

At 425, a coherency state for a line of data may be stored at the device memory 415. In some examples, the coherency state may be stored for a plurality of lines of data. For example, a coherency state for each line of data may be stored to the device memory 415. As described herein, the coherency state may correspond to a "invalid," "any," or "shared" state, and may be stored in the Meta® field associated with the respective line of data. In other examples, at 425, the coherency state for the data may be updated. That is, a coherency state for one or more lines of data may have been previously stored to the device memory 415 but, due to a change in the coherency state, the stored state may be updated. In either instance, the coherency state stored at 425 may be used for determining a bias state associated with the data. Although illustrated as being stored at the device memory 415, the coherency state may be additionally or alternatively stored at the cache 420, as described below.

At 430, the processing unit 405 may determine to access a line of data. For example, the processing unit 405 may determine to read a line of data from the device memory 415 or may determine to write a line of data to the device memory 415. For exemplary purposes, the line of data may be stored at the device memory 415. However, in some examples, the line of data may be stored to the cache 420 (e.g., the data may be cached), and the processing unit 405 or the controller 410 may determine whether the data is stored to the cache 420 or the device memory 415.

At 435, the processing unit 405 may transmit signaling to the controller 410. The signaling may be in response to determining to access a line of data (e.g., at 425), and the signaling may include a command (e.g., a read command, a write command), a request, or another type of communication. The signaling may indicate, to the controller 410, the type of access operation and an address (e.g., a memory address) of the device memory 415 for the line of data.

At 440, the controller 410 may transmit signaling to the cache 420. The signaling may be in response to the signaling indicating the type of access operation and the address of the memory device 415 (e.g., at 435), and the signaling may include a command (e.g., a read command), a request, or another type of communication. The signaling may initiate a read on the cache 420 to determine if the associated line of data is stored to the cache 420.

At 445, the controller 410 may receive signaling from the cache 420. The signaling may be in response to the signaling transmitted at 440, and may indicate whether the line of data was stored to the cache (e.g., a cache "hit" or a cache "miss"). For exemplary purposes only, the signaling 445 may indicate a cache "miss."

At 450, the controller 410 may transmit signaling to the device memory 415. The signaling may be in response to the signaling indicating a cache "miss", and the signaling may include a command (e.g., a read command), a request, or another type of communication. The signaling may initiate a read on the device memory 415.

At 455, the controller 410 may receive signaling from the device memory 415. The signaling may be in response to the signaling transmitted at 450, and may include a line of data read from the device memory 415. Additionally, the signaling may include a Meta® state associated with the line of data. As described herein, the Meta® state may indicate a first value that corresponds to an "invalid" coherency state, a second value that corresponds to a "shared" coherency state, or a third value that corresponds to an "any" state.

Alternatively, the Meta® state may not be stored in the device memory 415, and the controller 410 may assume a Meta® state of "any" or "shared" upon the occurrence of a cache miss.

At 460, the controller 410 may determine a bias state of the line of data read from the device memory 415. The controller 410 may determine the bias state of the line of data in response to the signaling received by the controller 410 (e.g., at 455). For example, the signaling may have indicated that the Meta® field includes a first value corresponding to an "invalid" coherency state. Thus the controller 410 may determine a device bias state for the line of data stored to the first memory address and may complete processing the access operation without any interaction from a host device.

In other examples, the signaling (e.g., at 435) may indicate a write command at a second memory address of the device memory 415. In such examples, the controller 410 may determine the bias state for writing data to the second memory address based on the Meta® field associated with the line of data. For example, the controller 410 may transmit signaling to the device memory 415 to read a line of data from the device memory 415 that corresponds to the second memory address. In response, the controller 410 may receive signaling that indicates the Meta® state of the line of data. If the Meta® state corresponds to an "invalid" coherency state, the controller 410 may operate according to a device bias. In such an example, the controller 410 may write the data to the second memory address of the device memory 415 without any interaction from a host device.

In other examples, the controller 410 may not transmit signaling to the cache 420 and/or device memory 415 but may instead maintain a table for tracking a Meta® state of one or more lines of data. For example, for both read operations or write operations, the controller 410 may track a Meta® value on a per-line basis, such that when the processing unit determines to access data (e.g., at 430), the controller may determine the Meta® state based on the table. Accordingly, based on the Meta® state, the controller 410 may operate in either a device bias mode or a host bias mode.

At 465, data may be communicated to the processing unit 405. In some examples, the data may be communicated in response to determining the bias state of the data (e.g., at 450). The data may, in some examples, be communicated directly to the processing unit 405, while in other examples the data may be communicated to the controller 410, and the controller 410 may communicate the data to the processing unit 405.

At 470, the processing unit 405 may determine to access a line of data (e.g., another line of data). For example, the processing unit 405 may determine to read a line of data that is stored to the cache 420 (e.g., a cached line of data). For exemplary purposes, the line of data may be stored at the cache 420. However, in some examples, the line of data may not be stored to the cache 420 (e.g., the data may not be cached), resulting in a cache "miss." When a cache "miss" occurs, the controller 410 may determine to access the data according to a host bias mode.

At 475, the processing unit 405 may transmit signaling to the controller 410. The signaling may be in response to determining to access a line of data (e.g., at 465), and the signaling may include a command (e.g., a read command, a write command), a request, or another type of communication. The signaling may indicate, to the controller 410, the type of access operation and an address (e.g., a memory address) of the device memory 415.

At 480, the controller 410 may transmit signaling to the cache 420. The signaling may be in response to the signaling indicating the type of access operation and the address of the memory device 415 (e.g., at 475), and the signaling may include a command (e.g., a read command), a request, or another type of communication. The signaling may initiate a read on the cache 420 to determine if the associated line of data is stored to the cache 420.

At 485, the controller 410 may receive signaling from the cache 420. The signaling may be in response to the signaling transmitted at 440, and may indicate whether the line of data was stored to the cache (e.g., a cache "hit" or a cache "miss"). For exemplary purposes only, the signaling 445 may indicate a cache "hit." Accordingly, the signaling may include the line of data and the associated Meta® state, which may indicate a first value that corresponds to an "invalid" coherency state, a second value that corresponds to a "shared" coherency state, or a third value that corresponds to an "any" state.

At 490, the controller 410 may determine a bias state of the line of data read from the cache 420. The controller 410 may determine the bias state of the line of data in response to the signaling received by the controller 410 (e.g., at 485). For example, the signaling may have indicated that the Meta® field includes a first value corresponding to an "invalid" coherency state. Thus the controller 410 may determine a device bias state for the line of data stored to the cache and may complete processing the access operation without any interaction from a host device.

At 495, data may be communicated to the processing unit 405. In some examples, the data may be communicated in response to signaling transmitted from the controller 410 to the processing unit (e.g., at 475). The data may, in some examples, be communicated directly to the processing unit 405, while in other examples the data may be communicated to the controller 410, and the controller 410 may communicate the data to the processing unit 405. Whether the Meta® field is stored to the device memory 415, to the cache 420, or is tracked by the controller 410, utilizing the Meta0-state to track the bias state on a per-cache-line basis may improve the overall performance of the memory system while maintaining a relatively simplistic programming model.

Figure 5:
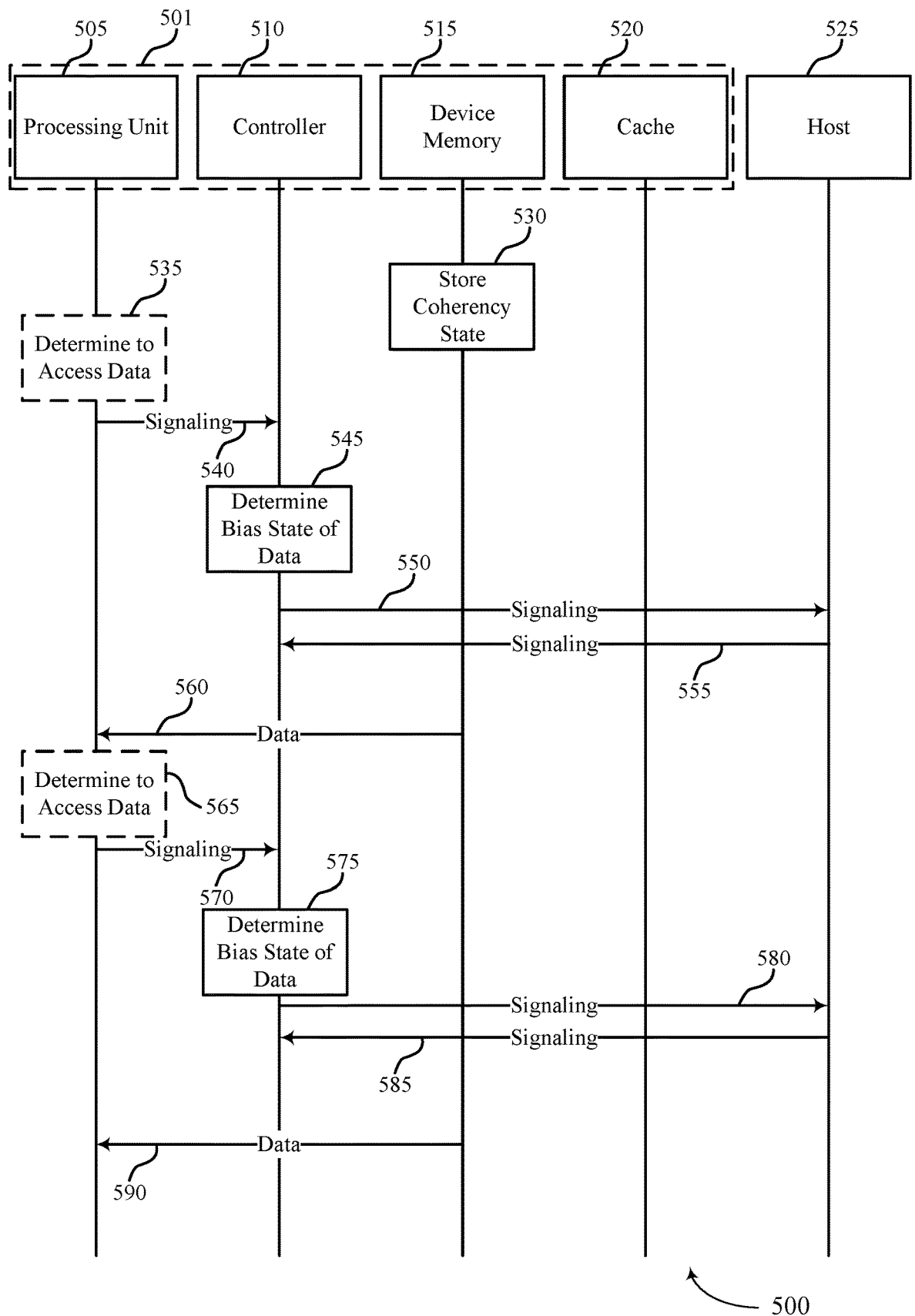
FIG. 5 illustrates an example of a process flow diagram that supports bias control for a memory device in accordance with examples as disclosed herein.

FIG. 5 illustrates an example of a process flow diagram 500 that supports bias control for a memory device in accordance with examples as disclosed herein. The process flow diagram 500 may illustrate the operations of a memory system 501 and a host device 525, which may be examples of a memory system 305 and a host device 310, respectively, as described with reference to FIG. 3. The memory system 501 may include a processing unit 505, a controller 510, a device memory 515, and a cache 520. The process flow diagram 500 may illustrate utilizing a Meta0-state to track a bias state on a per-cache-line basis, which may improve the overall performance of the memory system 501 while maintaining a relatively simplistic programming model.

At 530, a coherency state for a line of data may be stored at the device memory 515. In some examples, the coherency state may be stored for a plurality of data. For example, a coherency state for each line of data may be stored to the device memory 515. As described herein, the coherency state may correspond to a "invalid," "any," or "shared" state, and may be stored in the Meta® field associated with the respective line of data. In other examples, at 530, the coherency state for the data may be updated. That is, a coherency state for one or more lines of data may have been previously stored to the device memory 415 but, due to a change in the coherency state, the stored state may be updated. In either instance, the coherency state stored at 530 may be used for determining a bias state associated with the data.

At 535, the processing unit 505 may determine to access a line of data. For example, the processing unit 505 may determine to read a line of data from the device memory 515 or may determine to write a line of data to the device memory 515. For exemplary purposes, the line of data may be stored at the device memory 515. However, in some examples, the line of data may be stored to the cache 520 (e.g., the data may be cached), and the processing unit 505 or the controller 510 may determine whether the data is stored to the cache 520 or the device memory 515.

At 540, the processing unit 505 may transmit signaling to the controller 510. The signaling may be in response to determining to access a line of data (e.g., at 535), and the signaling may include a command (e.g., a read command, a write command), a request, or another type of communication. The signaling may indicate, to the controller 510, the type of access operation and an address (e.g., a memory address) of the device memory 515.

After 540, the controller 510 may transmit signaling to the cache 520, which is not shown in FIG. 5. The signaling may be in response to the signaling indicating the type of access operation and the address of the memory device 515 (e.g., at 540), and the signaling may include a command (e.g., a read command), a request, or another type of communication. The signaling may initiate a read on the cache 540 to determine if the associated line of data is stored to the cache 540.

After transmitting the signaling to the cache 520, the controller 510 may receive signaling from the cache 520, which is not shown in FIG. 5. The signaling may indicate whether the line of data was stored to the cache (e.g., a cache "hit" or a cache "miss"). For exemplary purposes only, such signaling indicate a cache "miss." In some examples, upon a cache "miss" then the controller 510 may assume to operate in a host bias mode.

After the controller 510 receives the signaling, the controller 510 may transmit signaling to the device memory 515, which is not shown in FIG. 5. The signaling may be in response to the signaling indicating a cache "miss", and the signaling may include a command (e.g., a read command), a request, or another type of communication. The signaling may initiate a read on the device memory 515.

After transmitting the signaling to the device memory 515, the controller 515 may receive signaling from the device memory 515, which is not shown in FIG. 5. The signaling may include a line of data read from the device memory 515. Additionally, the signaling may include a Meta® state associated with the line of data. As described herein, the Meta® state may indicate a first value that corresponds to an "invalid" coherency state, a second value that corresponds to a "shared" coherency state, or a third value that corresponds to an "any" state.

At 545, the controller 510 may determine a bias state of the line of data stored to the device memory 515 in response to receiving the line of data and associated Meta® state. The controller 510 may determine the bias state based on the Meta® state. For example, the Meta® field may indicate a first value that corresponds to an "invalid" coherency state and results in a device bias for the line of data. Additionally or alternatively, the Meta® field may indicate a second value that corresponds to a "shared" state or a third value that corresponds to an "any" state, both of which result in a host bias for the line of data. For exemplary purposes only, the controller 510 may determine a host bias state for the line of data stored to the first memory address.

At 550, the controller 510 may transmit signaling to the host device 525. The signaling may be in response to determining to access the device memory 415 according to a host bias mode (e.g., at 545), and the signaling may include a command (e.g., a read command), a request, or another type of communication. For example, the signaling may include a request for the host 525 to resolve coherency of the line of data, or may include a request for the host 525 to grant access of the line of data to the controller 510.

At 555, the host device 525 may transmit signaling to the controller 510 (or to another component of the memory system 501). The signaling may be in response to the signaling transmitted to the host device 525 (e.g., at 550), and the signaling may include a command (e.g., a second command, a read command), a request, or another type of communication. For example, the second command may resolve coherency of the data by granting direct access for the line of data to the controller 510.

In other examples, the signaling (e.g., at 540) may indicate a write command at a second memory address of the device memory 515. In such examples, the controller 510 may determine the bias state for writing data to the second memory address based on the Meta® field associated with the line of data. For example, the controller 510 may transmit signaling to the device memory 515 to read a line of data from the device memory 515 that corresponds to the second memory address. In response, the controller 510 may receive signaling that indicates the Meta® state of the line of data. If the Meta® state corresponds to an "invalid" coherency state, the controller 510 may operate according to a device bias. In such an example, the controller 510 may write the data to the second memory address of the device memory 515 without any interaction from a host device.

In other examples, the controller 510 may not transmit signaling to the cache 520 and/or device memory 515 but may instead maintain a table for tracking a Meta® state of one or more lines of data. For example, for both read operations or write operations, the controller 510 may track a Meta® value on a per-line basis, such that when the processing unit determines to access data (e.g., at 530), the controller may determine the Meta® state based on the table. Accordingly, based on the Meta® state, the controller 410 may operate in either a device bias mode or a host bias mode.

At 560, data may be communicated to the processing unit 505. In some examples, the data may be communicated in response to signaling transmitted to the controller 510 to from the host 525 (e.g., at 555). The data may, in some examples, be communicated directly to the processing unit 505, while in other examples the data may be communicated to the controller 510, and the controller 510 may communicate the data to the processing unit 505.

At 565, the processing unit 505 may determine to access a line of data (e.g., another line of data). For example, the processing unit 505 may determine to read a line of data that may be stored to the cache 520 (e.g., a cached line of data). For exemplary purposes, the line of data may not be stored at the cache 520. However, in some examples, the line of data may be stored to the cache 520 (e.g., the data may be cached), resulting in a cache "hit." When a cache "hit" occurs, the controller 510 may determine to access the data according a coherency state (e.g., a Meta® field) associated with the line of data.

At 570, the processing unit 505 may transmit signaling to the controller 510. The signaling may be in response to determining to access a line of data (e.g., at 565), and the signaling may include a command (e.g., a read command, a write command), a request, or another type of communication. The signaling may indicate, to the controller 510, the type of access operation and an address (e.g., a memory address) of the device memory 515.

After 570, the controller 510 may transmit signaling to the cache 520, which is not shown in FIG. 5. The signaling may be in response to the signaling indicating the type of access operation and the address of the memory device 515 (e.g., at 540), and the signaling may include a command (e.g., a read command), a request, or another type of communication. The signaling may initiate a read on the cache 520 to determine if the associated line of data is stored to the cache 520.

After transmitting the signaling to the cache 520, the controller 510 may receive signaling from the cache 520, which is not shown in FIG. 5. The signaling may indicate whether the line of data was stored to the cache (e.g., a cache "hit" or a cache "miss"). For exemplary purposes only, such signaling indicate a cache "hit." Additionally, the signaling may include a line of data read from the cache 520, and may include a Meta® state associated with the line of data. As described herein, the Meta® state may indicate a first value that corresponds to an "invalid" coherency state, a second value that corresponds to a "shared" coherency state, or a third value that corresponds to an "any" state.

At 575, the controller 510 may determine a bias state of the line of data stored to the cache 520 in response to receiving the line of data and associated Meta® state. The controller 510 may determine the bias state based on the Meta® state. For example, the Meta® field may indicate a first value that corresponds to an "invalid" coherency state and results in a device bias for the line of data. Additionally or alternatively, the Meta® field may indicate a second value that corresponds to a "shared" state or a third value that corresponds to an "any" state, both of which result in a host bias for the line of data. For exemplary purposes only, the controller 510 may determine a host bias state for the line of data stored to the cache 520.

At 580, the controller 510 may transmit signaling to the host device 525. The signaling may be in response to determining to access the cache 580 according to a host bias mode (e.g., at 575), and the signaling may include a command (e.g., a read command), a request, or another type of communication. For example, the signaling may include a request for the host 525 to resolve coherency of the line of data, or may include a request for the host 525 to grant access of the line of data to the controller 510.

At 585, the host device 525 may transmit signaling to the controller 510 (or to another component of the memory system 501). The signaling may be in response to the signaling transmitted to the host device 525 (e.g., at 580), and the signaling may include a command (e.g., a second command, a read command), a request, or another type of communication. For example, the second command may resolve coherency of the data by granting direct access for the line of data to the controller 510.

At 590, data may be communicated to the processing unit 505. The data may, in some examples, be communicated directly to the processing unit 505, while in other examples the data may be communicated to the controller 510, and the controller 510 may communicate the data to the processing unit 505. Whether the Meta® field is stored to the device memory 515, to the cache 520, or is tracked by the controller 510, utilizing the Meta0-state to track the bias state on a per-cache-line basis may improve the overall performance of the memory system while maintaining a relatively simplistic programming model.

Figure 6:
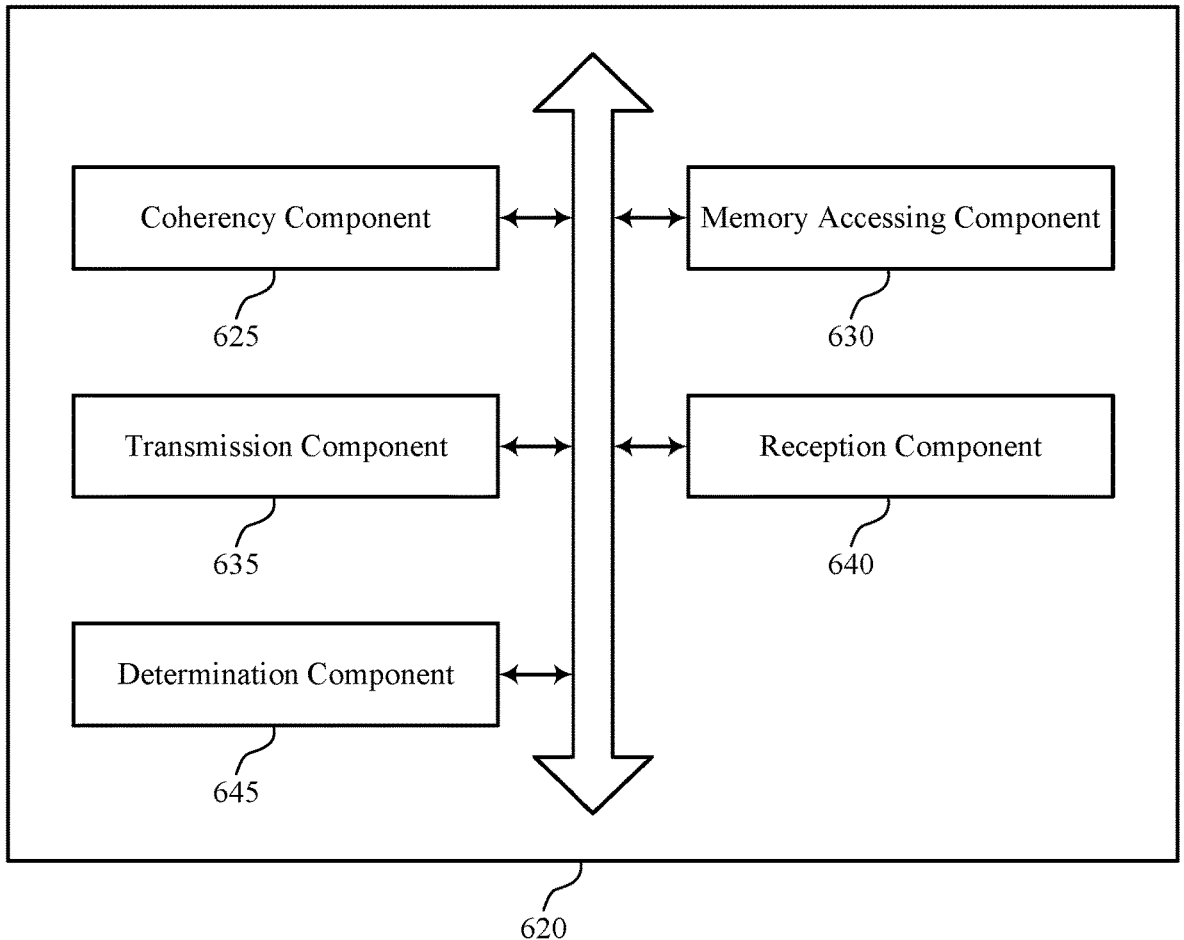
FIG. 6 shows a block diagram of a memory controller that supports bias control for a memory device in accordance with examples as disclosed herein.

FIG. 6 shows a block diagram 600 of a memory controller 620 that supports bias control for a memory device in accordance with examples as disclosed herein. The memory controller 620 may be an example of aspects of a memory controller as described with reference to FIGS. 1 through 5. The memory controller 620, or various components thereof, may be an example of means for performing various aspects of bias control for a memory device as described herein. For example, the memory controller 620 may include a coherency component 625, a memory accessing component 630, a transmission component 635, a reception component 640, a determination component 645, or any combination thereof. Each of these components may communicate, directly or indirectly, with one another (e.g., via one or more buses).

The coherency component 625 may be configured as or otherwise support a means for storing a coherency state for a set of data stored in a memory relative to a cache of a host device. In some examples, the coherency component 625 may be configured as or otherwise support a means for storing a coherency state for a set of data stored in a memory relative to a cache of a host device.

The memory accessing component 630 may be configured as or otherwise support a means for accessing the memory according to a bias state for the set of data determined based at least in part on the stored coherency state for the set of data based at least in part on identifying a command to perform an access operation for the set of data stored in the memory, where the bias state is associated with control of access for the set of data by a controller associated with the memory.

In some examples, the memory accessing component 630 may be configured as or otherwise support a means for accessing the memory independent of the host device based at least in part on the bias state. In some examples, the command includes a read command, and the memory accessing component 630 may be configured as or otherwise support a means for accessing the set of data stored to the cache based at least in part on determining that the set of data is stored to the cache associated with the memory.

In some examples, the memory accessing component 630 may be configured as or otherwise support a means for accessing the memory according to a bias state for the set of data determined based at least in part on the stored coherency state for the set of data based at least in part on identifying a command to perform an access operation for the set of data stored in the memory, where the bias state is associated with control of access for the set of data by the host device. In some examples, the command includes a read command, and the memory accessing component 630 may be configured as or otherwise support a means for accessing the memory for the set of data based at least in part on receiving the second command from the host device.

In some examples, the coherency state for the set of data is stored independent from the command, and the transmission component 635 may be configured as or otherwise support a means for transmitting, to the host device, an indication of the access operation to be performed on the set of data based at least in part on determining to process the command according to the bias state. In some examples, the transmission component 635 may be configured as or otherwise support a means for transmitting the set of data received from the host device to the memory based at least in part on receiving the set of data from the host device.

In some examples, the coherency state for the set of data is stored independent from the command, and the reception component 640 may be configured as or otherwise support a means for receiving, from the host device, a second command for indicating direct access for the set of data for the access operation based at least in part on transmitting the indication of the access operation.

In some examples, the command includes a read command, and the determination component 645 may be configured as or otherwise support a means for determining that the set of data is stored to a cache associated with the memory.

In some examples, the memory is configured to store a first value that is associated with a first coherency state for the set of data, a second value that is associated with a second coherency state for the set of data, or a third value that is associated with a third coherency state for the set of data. In some examples, the first value indicates that the set of data is not coherent. In some examples, the second value and the third value indicate that the set of data is coherent, where the controller is configured to process the command according to the bias state based at least in part on the memory storing the first value for the set of data.

In some examples, the set of data is associated with a first quantity of data. In some examples, a cache line of the host device coupled with the memory is configured to store the first quantity of data. In some examples, the bias state corresponds to a first bias state and. In some examples, a second bias state is associated with control of access for the set of data by the host device. In some examples, the memory is configured to store a first value that is associated with a first coherency state for the set of data, a second value that is associated with a second coherency state for the set of data, or a third value that is associated with a third coherency state for the set of data.

In some examples, the first value indicates that an invalid version of the set of data is stored to the cache of the host device. In some examples, the second value indicates that a shared version or an exclusive version of the set of data is stored to the cache of the host device. In some examples, the third value indicates that the shared version of the set of data is stored to the cache of the host device. In some examples, the second value and the third value indicate that the set of data is coherent. In some examples, the command is processed according to the bias state based at least in part on the memory storing the second value or the third value for the set of data.

In some examples, the set of data is associated with a first quantity of data. In some examples, a cache line of the host device coupled with the memory is configured to store the first quantity of data. In some examples, a first bias state is associated with control of access for the set of data by the controller. In some examples, the bias state corresponds to a second bias state.

Figure 7:
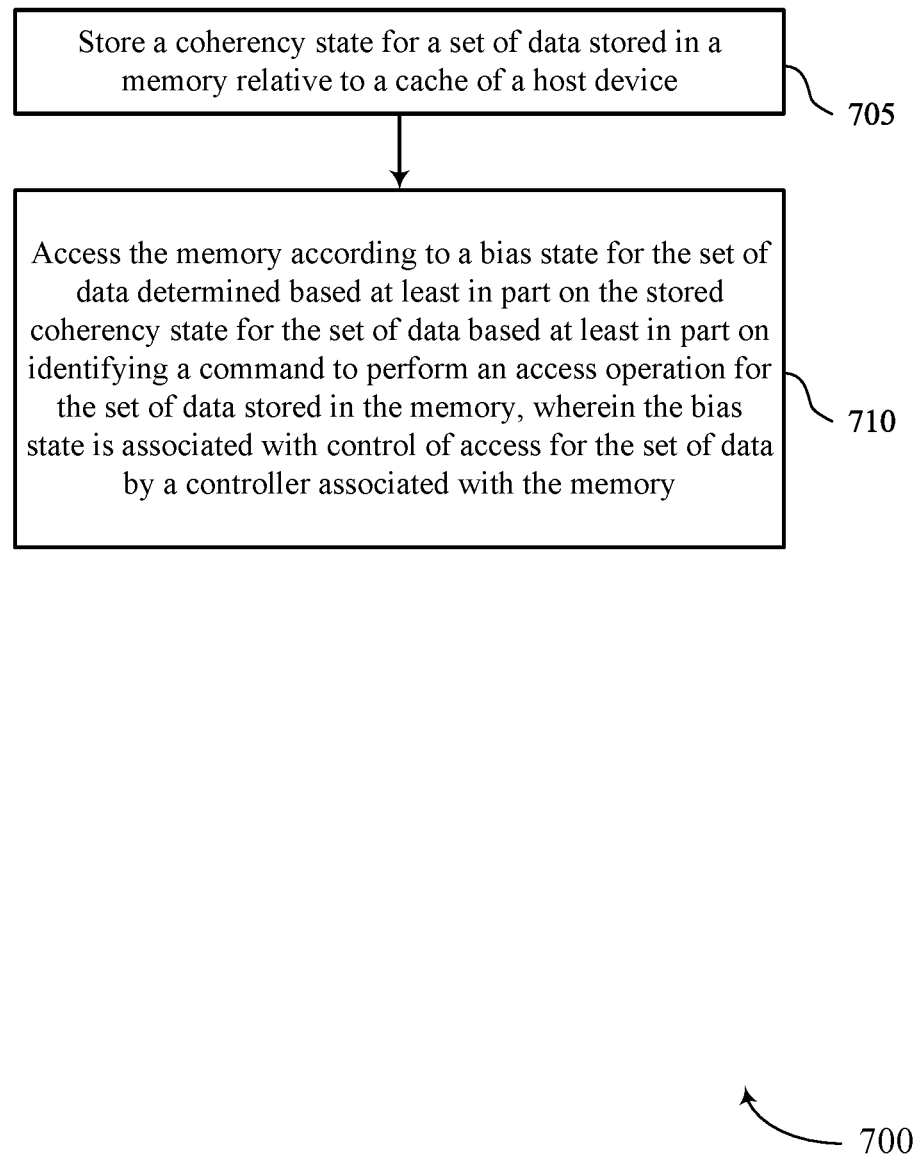
FIGS. 7 and 8 show flowcharts illustrating a method or methods that support bias control for a memory device in accordance with examples as disclosed herein.

FIG. 7 shows a flowchart illustrating a method 700 that supports bias control for a memory device in accordance with examples as disclosed herein. The operations of method 700 may be implemented by a memory controller or its components as described herein. For example, the operations of method 700 may be performed by a memory controller as described with reference to FIGS. 1 through 5 and 6. In some examples, a memory controller may execute a set of instructions to control the functional elements of the device to perform the described functions. Additionally or alternatively, the memory controller may perform aspects of the described functions using special-purpose hardware.

At 705, the method may include storing a coherency state for a set of data stored in a memory relative to a cache of a host device. The operations of 705 may be performed in accordance with examples as disclosed herein. In some examples, aspects of the operations of 705 may be performed by a coherency component 625 as described with reference to FIG. 6.

At 710, the method may include accessing the memory according to a bias state for the set of data determined based at least in part on the stored coherency state for the set of data based at least in part on identifying a command to perform an access operation for the set of data stored in the memory, where the bias state is associated with control of access for the set of data by a controller associated with the memory. The operations of 710 may be performed in accordance with examples as disclosed herein. In some examples, aspects of the operations of 710 may be performed by a memory accessing component 630 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for storing a coherency state for a set of data stored in a memory relative to a cache of a host device and accessing the memory according to a bias state for the set of data determined based at least in part on the stored coherency state for the set of data based at least in part on identifying a command to perform an access operation for the set of data stored in the memory, where the bias state is associated with control of access for the set of data by a controller associated with the memory.

Some examples of the method 700 and the apparatus described herein may further include operations, features, circuitry, logic, means, or instructions for accessing the memory independent of the host device based at least in part on the bias state.

In some examples of the method 700 and the apparatus described herein, the command includes a read command and the method, apparatuses, and non-transitory computer-readable medium may include further operations, features, circuitry, logic, means, or instructions for determining that the set of data may be stored to a cache associated with the memory and accessing the set of data stored to the cache based at least in part on determining that the set of data may be stored to the cache associated with the memory.

In some examples of the method 700 and the apparatus described herein, the memory may be configured to store a first value that may be associated with a first coherency state for the set of data, a second value that may be associated with a second coherency state for the set of data, or a third value that may be associated with a third coherency state for the set of data.

In some examples of the method 700 and the apparatus described herein, the first value indicates that the set of data may be not coherent and the second value and the third value indicate that the set of data may be coherent, where the controller may be configured to process the command according to the bias state based at least in part on the memory storing the first value for the set of data.

In some examples of the method 700 and the apparatus described herein, the set of data may be associated with a first quantity of data, and a cache line of the host device coupled with the memory may be configured to store the first quantity of data.

In some examples of the method 700 and the apparatus described herein, the bias state corresponds to a first bias state and a second bias state may be associated with control of access for the set of data by the host device.

Figure 8:
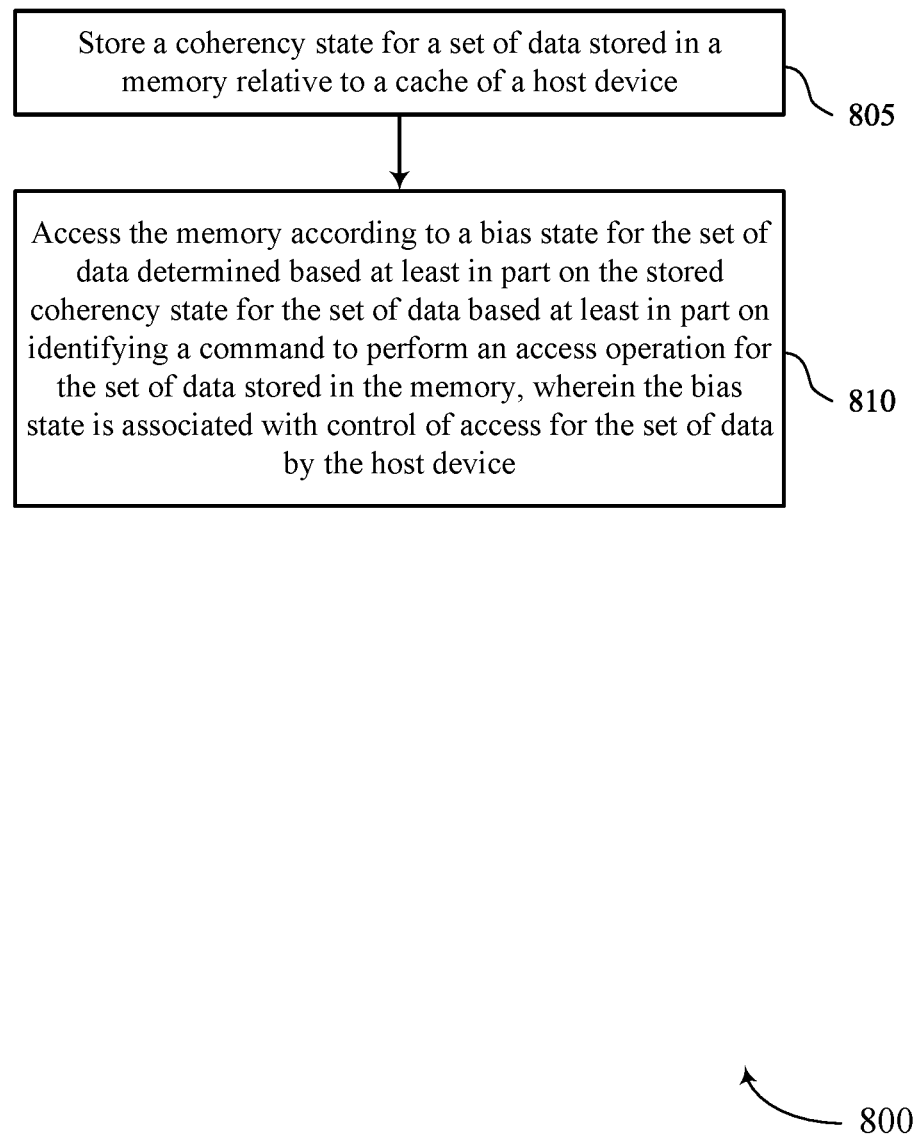

FIG. 8 shows a flowchart illustrating a method 800 that supports bias control for a memory device in accordance with examples as disclosed herein. The operations of method 800 may be implemented by a memory controller or its components as described herein. For example, the operations of method 800 may be performed by a memory controller as described with reference to FIGS. 1 through 5 and 6. In some examples, a memory controller may execute a set of instructions to control the functional elements of the device to perform the described functions. Additionally or alternatively, the memory controller may perform aspects of the described functions using special-purpose hardware.

At 805, the method may include storing a coherency state for a set of data stored in a memory relative to a cache of a host device. The operations of 805 may be performed in accordance with examples as disclosed herein. In some examples, aspects of the operations of 805 may be performed by a coherency component 625 as described with reference to FIG. 6.

At 810, the method may include accessing the memory according to a bias state for the set of data determined based at least in part on the stored coherency state for the set of data based at least in part on identifying a command to perform an access operation for the set of data stored in the memory, where the bias state is associated with control of access for the set of data by the host device. The operations of 810 may be performed in accordance with examples as disclosed herein. In some examples, aspects of the operations of 810 may be performed by a memory accessing component 630 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for storing a coherency state for a set of data stored in a memory relative to a cache of a host device and accessing the memory according to a bias state for the set of data determined based at least in part on the stored coherency state for the set of data based at least in part on identifying a command to perform an access operation for the set of data stored in the memory, where the bias state is associated with control of access for the set of data by the host device.

In some examples of the method 800 and the apparatus described herein, the coherency state for the set of data may be stored independent from the command and the method, apparatuses, and non-transitory computer-readable medium may include further operations, features, circuitry, logic, means, or instructions for transmitting, to the host device, an indication of the access operation to be performed on the set of data based at least in part on determining to process the command according to the bias state and receiving, from the host device, a second command for indicating direct access for the set of data for the access operation based at least in part on transmitting the indication of the access operation.

In some examples of the method 800 and the apparatus described herein, the command includes a read command and the method, apparatuses, and non-transitory computer-readable medium may include further operations, features, circuitry, logic, means, or instructions for accessing the memory for the set of data based at least in part on receiving the second command from the host device.

Some examples of the method 800 and the apparatus described herein may further include operations, features, circuitry, logic, means, or instructions for transmitting the set of data received from the host device to the memory based at least in part on receiving the set of data from the host device.

In some examples of the method 800 and the apparatus described herein, the memory may be configured to store a first value that may be associated with a first coherency state for the set of data, a second value that may be associated with a second coherency state for the set of data, or a third value that may be associated with a third coherency state for the set of data.

In some examples of the method 800 and the apparatus described herein, the first value indicates that an invalid version of the set of data may be stored to the cache of the host device, the second value indicates that a shared version or an exclusive version of the set of data may be stored to the cache of the host device, and the third value indicates that the shared version of the set of data may be stored to the cache of the host device.

In some examples of the method 800 and the apparatus described herein, the second value and the third value indicate that the set of data may be coherent, and the command may be processed according to the bias state based at least in part on the memory storing the second value or the third value for the set of data.

In some examples of the method 800 and the apparatus described herein, the set of data may be associated with a first quantity of data, and a cache line of the host device coupled with the memory may be configured to store the first quantity of data.

In some examples of the method 800 and the apparatus described herein, a first bias state may be associated with control of access for the set of data by the controller, and the bias state corresponds to a second bias state.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system, comprising:
a memory; and
a controller coupled with the memory, wherein the controller is configured to:
store a coherency state for a set of data stored in the memory relative to a cache of a host device; and
access the memory according to a bias state for the set of data determined based at least in part on the stored coherency state for the set of data based at least in part on identifying a command to perform an access operation for the set of data stored in the memory, wherein the bias state is associated with control of access for the set of data by the controller.

2. The system of claim 1, wherein the controller is configured to access the memory independent of the host device based at least in part on the bias state.

3. The system of claim 2, further comprising:
a cache associated with the memory, wherein the command comprises a read command, and wherein the controller is configured to:
determine that the set of data is stored to the cache associated with the memory based at least in part on identifying the command; and
accessing the set of data stored to the cache based at least in part on determining that the set of data is stored to the cache.

4. The system of claim 3, wherein the controller is configured to:
determine that a second set of data is not stored to the cache based at least in part on identifying a command to perform an access operation for the second set of data; and
access the memory according to a second bias state for the second set of data based at least in part on determining that the second set of data is not stored to the cache, wherein the second bias state is associated with control of access for the second set of data by the host device.

5. The system of claim 1, wherein the memory is configured to store a first value that is associated with a first coherency state for the set of data, a second value that is associated with a second coherency state for the set of data, or a third value that is associated with a third coherency state for the set of data.

6. The system of claim 5, wherein:
the first value indicates that the set of data is not coherent; and
the second value and the third value indicate that the set of data is coherent, wherein the controller is configured to process the command according to the bias state based at least in part on the memory storing the first value for the set of data.

7. The system of claim 1, wherein
the set of data is associated with a first quantity of data, and wherein a cache line of the host device coupled with the memory is configured to store the first quantity of data.

8. The system of claim 1, wherein
the bias state corresponds to a first bias state, and wherein a second bias state is associated with control of access for the set of data by the host device.

9. A system, comprising:
a memory; and
a controller coupled with the memory, wherein the controller is configured to:
store a coherency state for a set of data stored in the memory relative to a cache of a host device; and access the memory according to a bias state for the set of data determined based at least in part on the stored coherency state for the set of data based at least in part on identifying a command to perform an access operation for the set of data stored in the memory, wherein the bias state is associated with control of access for the set of data by the host device.

10. The system of claim 9, wherein the controller is configured to store the coherency state for the set of data independent from the command, wherein the controller is configured to:
transmit, to the host device, an indication of the access operation to be performed on the set of data based at least in part on determining to process the command according to the bias state; and
receive, from the host device, a second command for indicating direct access for the set of data for the access operation based at least in part on transmitting the indication of the access operation.

11. The system of claim 10, wherein the controller is configured to access the memory for the set of data based at least in part on receiving the second command from the host device.

12. The system of claim 9, wherein the memory is configured to store a first value that is associated with a first coherency state for the set of data, a second value that is associated with a second coherency state for the set of data, or a third value that is associated with a third coherency state for the set of data.

13. The system of claim 12, wherein:
the first value indicates that an invalid version of the set of data is stored to the cache of the host device;
the second value indicates that a shared version or an exclusive version of the set of data is stored to the cache of the host device; and
the third value indicates that the shared version of the set of data is stored to the cache of the host device.

14. The system of claim 12, wherein
the second value and the third value indicate that the set of data is coherent, and wherein the controller is configured to process the command according to the bias state based at least in part on the memory storing the second value or the third value for the set of data.

15. The system of claim 9, wherein
the set of data is associated with a first quantity of data, and wherein a cache line of the host device coupled with the memory is configured to store the first quantity of data.

16. The system of claim 9, wherein
a first bias state is associated with control of access for the set of data by the controller, and wherein the bias state corresponds to a second bias state.

17. A method, comprising:
storing a coherency state for a set of data stored in a memory relative to a cache of a host device; and
accessing the memory according to a bias state for the set of data determined based at least in part on the stored coherency state for the set of data based at least in part on identifying a command to perform an access operation for the set of data stored in the memory, wherein the bias state is associated with control of access for the set of data by a controller associated with the memory.

18. The method of claim 17, further comprising:
accessing the memory independent of the host device based at least in part on the bias state.

19. The method of claim 18, wherein the command comprises a read command, the method further comprising:
determining that the set of data is stored to a cache associated with the memory; and
accessing the set of data stored to the cache based at least in part on determining that the set of data is stored to the cache associated with the memory.

20. The method of claim 17, wherein the memory is configured to store a first value that is associated with a first coherency state for the set of data, a second value that is associated with a second coherency state for the set of data, or a third value that is associated with a third coherency state for the set of data.

21. The method of claim 20, wherein:
the first value indicates that the set of data is not coherent; and
the second value and the third value indicate that the set of data is coherent, wherein the controller is configured to process the command according to the bias state based at least in part on the memory storing the first value for the set of data.

22. The method of claim 17, wherein
the set of data is associated with a first quantity of data, and wherein a cache line of the host device coupled with the memory is configured to store the first quantity of data.

23. The method of claim 17, wherein
the bias state corresponds to a first bias state, and wherein a second bias state is associated with control of access for the set of data by the host device.

24. A method, comprising:
storing a coherency state for a set of data stored in a memory relative to a cache of a host device; and
accessing the memory according to a bias state for the set of data determined based at least in part on the stored coherency state for the set of data based at least in part on identifying a command to perform an access operation for the set of data stored in the memory, wherein the bias state is associated with control of access for the set of data by the host device.

25. The method of claim 24, wherein the coherency state for the set of data is stored independent from the command, the method further comprising:
transmitting, to the host device, an indication of the access operation to be performed on the set of data based at least in part on determining to process the command according to the bias state; and
receiving, from the host device, a second command for indicating direct access for the set of data for the access operation based at least in part on transmitting the indication of the access operation.

26. The method of claim 25, wherein the command comprises a read command, the method further comprising:
accessing the memory for the set of data based at least in part on receiving the second command from the host device.

27. The method of claim 26, further comprising:
transmitting the set of data received from the host device to the memory based at least in part on receiving the set of data from the host device.

28. The method of claim 24, wherein the memory is configured to store a first value that is associated with a first coherency state for the set of data, a second value that is associated with a second coherency state for the set of data, or a third value that is associated with a third coherency state for the set of data.

29. The method of claim 28, wherein:
the first value indicates that an invalid version of the set of data is stored to the cache of the host device;

the second value indicates that a shared version or an exclusive version of the set of data is stored to the cache of the host device; and the third value indicates that the shared version of the set of data is stored to the cache of the host device.

30. The method of claim 28, wherein the second value and the third value indicate that the set of data is coherent, and wherein the command is processed according to the bias state based at least in part on the memory storing the second value or the third value for the set of data.

31. The method of claim 24, wherein the set of data is associated with a first quantity of data, and wherein a cache line of the host device coupled with the memory is configured to store the first quantity of data.

32. The method of claim 24, wherein a first bias state is associated with control of access for the set of data by the controller, and wherein the bias state corresponds to a second bias state.

33. A non-transitory computer-readable medium storing code comprising instructions, which when executed by a processor of an electronic device, cause the electronic device to:

store a coherency state for a set of data stored in a memory relative to a cache of a host device; and access the memory according to a bias state for the set of data determined based at least in part on the stored coherency state for the set of data based at least in part on identifying a command to perform an access operation for the set of data stored in the memory, wherein the bias state is associated with control of access for the set of data by a controller associated with the memory.

\* \* \* \* \*